(12) United States Patent
Chou

(10) Patent No.: US 11,208,055 B2
(45) Date of Patent: Dec. 28, 2021

(54) PROTECTIVE PANEL ASSEMBLIES

(71) Applicant: Toyota Motor Engineering & Manufacturing North America, Inc., Plano, TX (US)

(72) Inventor: Warren Jing Po Chou, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 63 days.

(21) Appl. No.: 16/726,320

(22) Filed: Dec. 24, 2019

(65) Prior Publication Data

US 2021/0188195 A1   Jun. 24, 2021

(51) Int. Cl.
*B60R 13/04* (2006.01)
*B60J 11/06* (2006.01)

(52) U.S. Cl.
CPC .............. *B60R 13/04* (2013.01); *B60J 11/06* (2013.01)

(58) Field of Classification Search
CPC ........... B60R 13/04; B60R 19/42; B60J 11/06
USPC ...... 296/136.02; 280/770; 293/128; 150/166
See application file for complete search history.

(56) References Cited

U.S. PATENT DOCUMENTS

| | | | |
|---|---|---|---|
| 3,147,176 A * | 9/1964 | Haslam ................... | B60R 13/04 428/55 |
| 3,855,898 A | 12/1974 | McDonald | |
| 4,002,363 A * | 1/1977 | James ..................... | B60R 13/04 293/128 |
| 4,014,583 A * | 3/1977 | Forbes .................... | B60R 13/04 293/128 |
| 4,041,999 A | 8/1977 | Miller | |
| 4,294,478 A * | 10/1981 | Marquette .............. | B60R 13/04 293/128 |
| 4,498,697 A * | 2/1985 | McGlone ................ | B60R 13/04 293/128 |
| 4,589,459 A | 5/1986 | Lantrip | |
| 4,635,993 A * | 1/1987 | Hooper ................... | B60J 11/08 160/370.21 |
| 4,810,015 A * | 3/1989 | McNeil ................... | B60J 11/06 150/166 |
| 4,974,893 A * | 12/1990 | Grahn .................... | E01H 1/1206 15/104.8 |
| 4,974,897 A * | 12/1990 | Shirley .................. | B60J 3/0208 296/97.1 |
| 4,995,659 A * | 2/1991 | Park ....................... | B60R 13/00 293/107 |
| 5,056,817 A * | 10/1991 | Fuller .................... | B60J 11/06 280/770 |

(Continued)

OTHER PUBLICATIONS

"Rugged ridge magnetic protection panel kit", Sep. 23, 2019; URL: https://www.autoaccessoriesgarage.com/Jeep-Exterior-Accessories/Rugged-Ridge-Magnetic-Protection-Panel-Kit.

*Primary Examiner* — Gregory A Blankenship
(74) *Attorney, Agent, or Firm* — Dinsmore & Shohl LLP

(57) ABSTRACT

A protective panel assembly for protecting an exterior surface of a vehicle, the protective panel assembly including a panel having an inner layer, an outer layer, and a plurality of rigid members. The inner layer and the outer layer are formed of a flexible material. The plurality of rigid members are positioned between the inner layer and the outer layer. The plurality of rigid members being spaced apart from each other.

10 Claims, 3 Drawing Sheets

(56) References Cited

U.S. PATENT DOCUMENTS

| | | | |
|---|---|---|---|
| 5,129,695 A * | 7/1992 | Norman, II | B60J 11/06 280/770 |
| 5,149,166 A * | 9/1992 | Wille | B60R 13/04 293/128 |
| 5,209,545 A | 5/1993 | Slaugh | |
| 5,605,369 A | 2/1997 | Ruiz | |
| 5,638,642 A * | 6/1997 | Nemec | B60J 11/00 150/166 |
| 5,738,403 A * | 4/1998 | Tyson | B60J 11/00 296/136.02 |
| 5,984,401 A * | 11/1999 | Hannah | B60J 11/00 248/205.9 |
| 6,056,347 A * | 5/2000 | D'Adamo | B60J 11/00 296/136.02 |
| 6,254,170 B1 * | 7/2001 | Farmer | B60J 11/06 150/166 |
| 6,406,080 B1 * | 6/2002 | Davis | B60R 19/42 293/128 |
| 6,457,755 B1 * | 10/2002 | Nieto | B60R 19/42 293/128 |
| 6,572,086 B2 * | 6/2003 | Kelly | B60R 19/44 267/136 |
| 6,595,575 B2 * | 7/2003 | Morris | B60R 13/04 280/770 |
| 7,090,266 B1 * | 8/2006 | Price | B60R 19/42 280/770 |
| 7,100,965 B1 | 9/2006 | Stover | |
| 7,222,562 B2 * | 5/2007 | Smiley | F41H 7/04 296/136.02 |
| 7,229,108 B2 * | 6/2007 | Hochrein | B60R 13/04 293/128 |
| 7,488,028 B2 * | 2/2009 | Medford | B60R 13/00 296/136.01 |
| 8,303,005 B1 * | 11/2012 | Hill | B60R 13/043 293/126 |
| 8,441,191 B2 * | 5/2013 | Protz | H01J 25/10 315/5.39 |
| 8,573,661 B1 * | 11/2013 | Moreno | B60R 13/04 293/128 |
| 9,067,482 B1 * | 6/2015 | Ferlinghetti | B60J 11/06 |
| 9,457,747 B1 * | 10/2016 | Marquette | B60R 13/04 |
| 9,499,112 B1 * | 11/2016 | Straw | B60R 19/42 |
| 9,771,032 B2 * | 9/2017 | Ardrey | B60R 13/04 |
| 10,029,627 B2 * | 7/2018 | Ardrey | B60R 13/04 |
| 10,493,832 B1 * | 12/2019 | White | B60J 11/06 |
| 2003/0006732 A1 * | 1/2003 | Liao | H02J 7/0045 320/114 |
| 2003/0209914 A1 * | 11/2003 | Cano | B60R 19/42 293/128 |
| 2006/0181102 A1 | 8/2006 | Lemieux | |
| 2009/0140533 A1 * | 6/2009 | Keough | B60R 19/42 293/109 |
| 2010/0007169 A1 | 1/2010 | Nguyen | |
| 2013/0320684 A1 * | 12/2013 | Darrett | B60R 13/043 293/118 |
| 2016/0121706 A1 * | 5/2016 | Garfield | B60J 11/06 293/128 |
| 2016/0365015 A1 * | 12/2016 | Young | G09F 7/18 |

* cited by examiner

PROTECTIVE PANEL ASSEMBLIES

TECHNICAL FIELD

The present specification generally relates to protective panel assemblies for protecting an exterior surface of a vehicle from damage and, more specifically, protective panels for protecting the exterior surface of a vehicle from damage caused by debris.

BACKGROUND

Vehicles are constantly subjected to damage caused by incoming debris, such as dirt, rocks, and the like, when being driven off road. Damage caused by smaller debris may result in scratches to the paint on the exterior of the vehicle while larger debris can cause dents in the vehicle. However, when there is no risk of damage, it may be desirable to remove such panels and store the panels until they are needed. Accordingly, a need exists for alternative protective panel assemblies attachable to the exterior of a vehicle for protecting the vehicle from incoming debris and which can easily be stored when not in use.

SUMMARY

In one embodiment, a protective panel assembly for protecting an exterior surface of a vehicle, the protective panel assembly including a panel having an inner layer, an outer layer, and a plurality of rigid members. The inner layer and the outer layer are formed of a flexible material. The plurality of rigid members are positioned between the inner layer and the outer layer. The plurality of rigid members being spaced apart from each other.

In some embodiments, the inner layer and the outer layer of the panel are attached together to form a plurality of pockets. Each pocket houses one of the plurality of rigid members such that the plurality of rigid members are entirely embedded within the plurality of pockets. The panel includes at least connecting member extending from a first side edge of the panel and at least one connecting member extending from a second side edge of the panel for connecting the panel to a vehicle. In some embodiments, the at least one connecting member on the first side edge of the panel is offset from the at least one connecting member on the second side edge of the panel.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
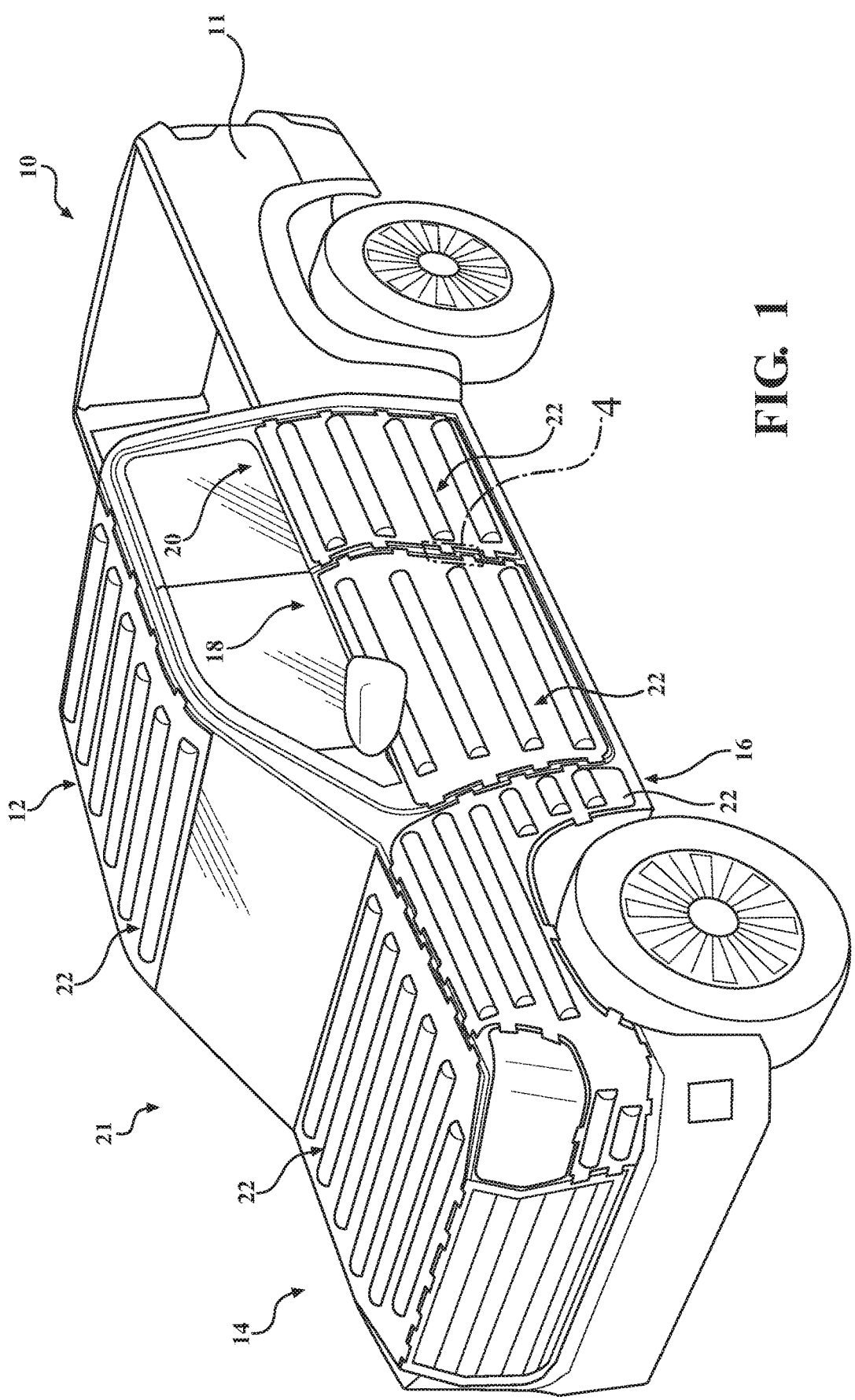
FIG. 1 schematically depicts a perspective view of a vehicle including a protective panel assembly having a plurality of panels, according to one or more embodiments shown and described herein.

Reference will now be made in detail to embodiments of the protective panels described herein, examples of which are illustrated in the accompanying drawings. Whenever possible, the same reference numerals will be used throughout the drawings to refer to the same or like parts.

Figure 2:
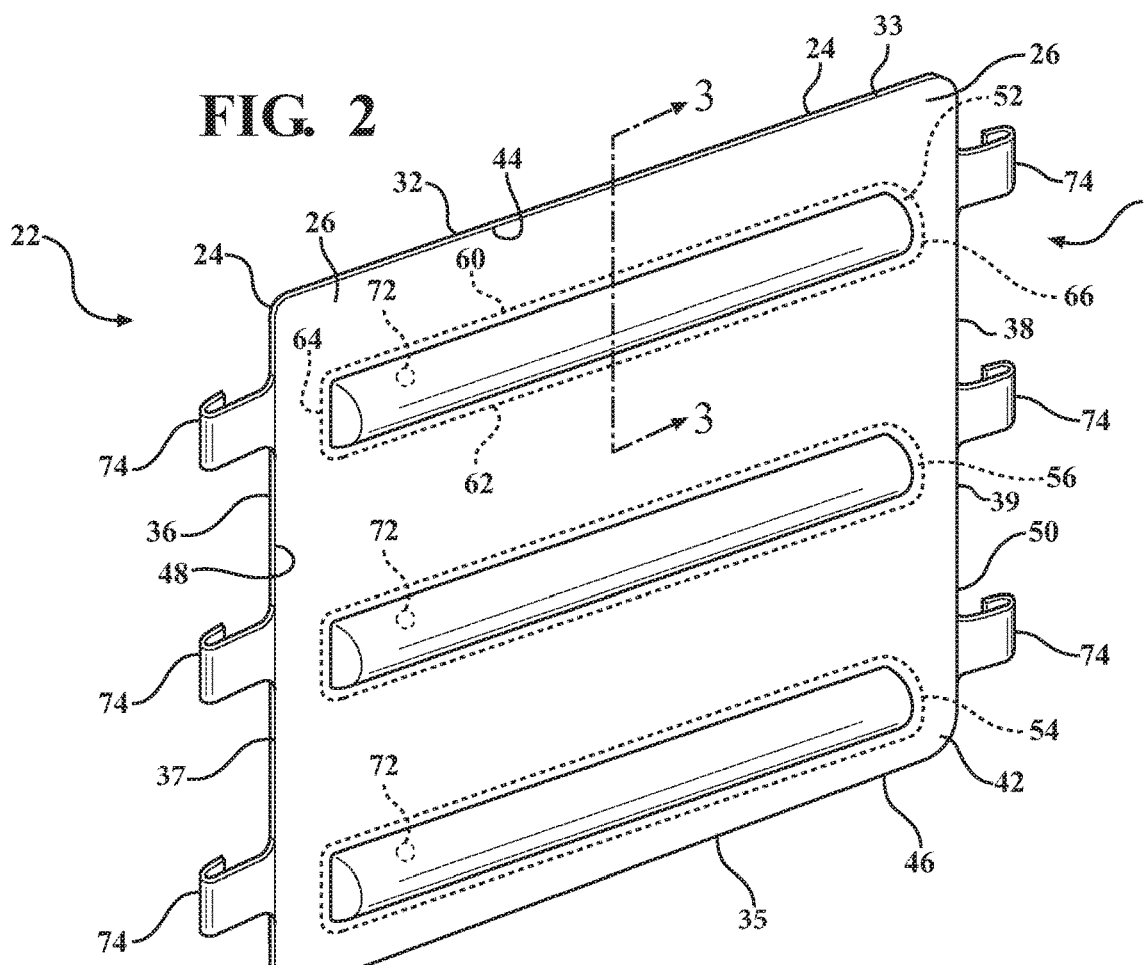
FIG. 2 schematically depicts a perspective view of a panel of the protective panel assembly of FIG. 1, according to one or more embodiments shown and described herein.
Figure 3:
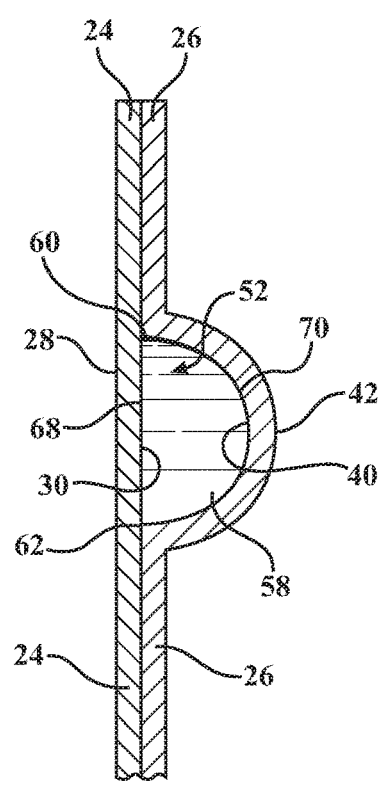
FIG. 3 schematically depicts a partial cross-sectional view of the protective panel taken along line 3-3 of FIG. 2, according to one or more embodiments shown and described herein.

In some embodiments, a protective panel is illustrated in FIGS. 2 and 3 and generally includes an inner layer and an outer layer formed from a flexible material. A plurality of rigid members extend between the inner layer and the outer layer. Each of the rigid members are entirely embedded between the inner layer and the outer layer. Various embodiments of the protective panels are described in more detail herein.

Referring now to FIG. 1, a vehicle is generally illustrated at 10. The vehicle 10 includes a plurality of exterior body surfaces 11. The plurality of exterior body surfaces 11 are an exterior surface of the vehicle 10. The plurality of exterior body surfaces 11 include, but are not limited to, a roof 12, a hood 14, a front fender 16, a front driver door 18, and a rear passenger door 20. It is appreciated that the plurality of exterior body surfaces 11 include any exterior surface of the vehicle 10 including rear quarter panels and a tailgate.

A protective panel assembly 21 is coupled to the plurality of exterior body surfaces 11. The protective panel assembly 21 includes a plurality of protective panels 22 configured to couple to and cover each of the exterior body surfaces 11. It is to be understood that the present disclosure is not limited to protective panels on a truck as shown. As such, the panels 22 disclosed herein may be suitable to protect an exterior of any object such as a sedan, coupe, minivan, sports utility vehicle, station wagon, motorcycle, boat, bus, airplane or the like.

As shown in FIGS. 2-3, each panel 22 may generally comprise an inner layer 24 and an outer layer 26. The inner layer 24 has an inner surface 28, an opposite outer surface 30, an upper edge 32, an opposite lower edge 34, and a pair of opposing side edges 36, 38. In some embodiments, the inner surface 28 of the inner layer 24 has a soft liner such as, for example, felt, in order to prevent damage to the exterior body surface 11 of the vehicle 10. The outer layer 26 includes an interior surface 40, an opposite exterior surface 42, an upper edge 44, an opposite lower edge 46, and a pair of side edges 48, 50. In some embodiments, the inner layer 24 and the outer layer 26 are formed from a flexible yet durable material, such as but not limited to vinyl, polyvinyl chloride (PVC), or rubber. The inner layer 24 and the outer layer 26 are joined together by sewing, fabric welding, using an adhesive, or the like. Specifically, the upper edge 32 of the inner layer 24 is joined to the upper edge 44 of the outer layer 26 to form an upper edge 33 of the panel 22, the lower edge 34 of the inner layer 24 is joined to the lower edge 46 of the outer layer 26 to form a lower edge 35 of the panel 22, side edge 36 of the inner layer 24 is joined to side edge 48 of the outer layer 26 to form a side edge 37 of the panel 22, and side edge 38 of the inner layer 24 is joined to side edge 50 of the outer layer 26 to form an opposite side edge 39 of the panel 22.

A plurality of elongated pockets 52, 54, 56 are formed between the inner layer 24 and the outer layer 26 by joining interior portions or edges of the inner layer 24 and the outer layer 26, discussed in more detail below. As shown in FIG. 2, the panel 22 includes an upper pocket 52, a lower pocket 54, and at least one intermediate pocket 56 between the upper pocket 52 and the lower pocket 54 are formed. The upper pocket 52 is formed proximate the upper edge 33 of the panel 22 and the lower pocket 54 is formed proximate the lower edge 35 of the panel 22. While the embodiment illustrated in FIG. 3 shows one intermediate pocket 56, any number of intermediate pockets 56 may be provided between the upper pocket 52 and the lower pocket 54. In some embodiments, the pockets 52, 54, 56 are equidistantly spaced apart from one another. In some embodiments, the pockets 52, 54, 56 are parallel to one another and extend longitudinally between the side edges 37, 39 of the panel 22.

As shown in FIG. 3, an elongated rigid member 58 is positioned within each of the pockets 52, 54, 56. As such, the rigid members 58 are entirely embedded within the panel 22 between the inner layer 24 and the outer layer 26, specifically, the rigid members 58 are positioned between the outer surface 30 of the inner layer 24 and the interior surface 40 of the outer layer 26. Each rigid member 58 is dimensioned to substantially fill the entire pocket in which it is housed. The rigid members 58 provide additional durability to the panel 22 without inhibiting its ability to be rolled when removed from the vehicle 10 and stored. The rigid members 58 may be formed from a metal, such as titanium, steel, magnesium, or a rigid plastic, such as high density polyethylene, polyvinyl chloride, or nylon. It is to be understood that the present disclosure is not meant to be limited by the materials disclosed herein. In embodiments where the pockets 52, 54, 56 are equidistantly spaced apart from one another, the rigid members 58 are also equidistantly spaced apart from one another. Similarly, in embodiments in which the pockets 52, 54, 56 are parallel, the rigid members 58 are thus parallel to one another and also extend longitudinally between the side edges 37, 39 of the panel 22.

While the dimensions of the pockets 52, 54, 56 may differ, it is to be understood that the formation of the pockets 52, 54, 56 and their general structure are substantially similar. Thus, only the construction of the upper pocket 52 and the rigid member 58 provided therein will be described. With respect to the formation of the upper pocket 52, the inner layer 24 and the outer layer 26 are joined at a first edge 60 and an opposite second edge 62 to define upper and lower bounds or a height of the upper pocket 52. Additionally, the inner layer 24 and the outer layer 26 are joined at a third edge 64 and a fourth edge 66 to define side bounds or a length of the upper pocket 52. As discussed above, the inner layer 24 and the outer layer 26 may be joined to form these edges 60, 62, 64, 66 in any suitable manner such as by sewing, fabric welding, using an adhesive, or the like. In some embodiments, in addition to the upper edge 33, lower edge 35, and side edges 37, 39 of the panel 22 being joined, the outer surface 30 of the inner layer 24 and the interior surface 40 of the outer layer 26, other than at the pockets 52, 54, 56, may be joined as well.

As shown in FIG. 3, the upper pocket 52 is shown with the rigid member 58 provided therein. It should be understood that, when in use, the inner surface 28 of the inner layer 24 abuts against the exterior body surface 11 of the vehicle 10. Therefore, in some embodiments, the rigid member 58 has a generally D-shaped cross-section to avoid forming a protrusion in the inner layer 24 toward the vehicle 10. As such, each rigid member 58 includes a planar surface 68 and a curved surface 70. The planar surface 68 of the rigid member 58 is planar and lies flush against the outer surface 30 of the inner layer 24. The curved surface 70 of the rigid member 58 has a generally arcuate or convex shape and contacts the interior surface 40 of the outer layer 26 to form a protrusion extending opposite the inner layer 24. As such, the curved surface 70 of the rigid member 58 extends outwardly beyond portions of the exterior surface 42 of the outer layer 26 where the upper pocket 52 is not formed.

In some embodiments, the protrusion formed in the upper pocket 52 is formed due to the fact that the outer layer 26 is formed from a semi-elastic material such that the outer layer 26 stretches between the first and second edges 60, 62 when the rigid member 58 is inserted therein. Alternatively, in another embodiment, an excess amount of material may be provided between the first and second edges 60, 62 on the outer layer 26 as compared to the amount of material provided between the first and second edges 60, 62 on the inner layer 24. As a result, a space is provided between the inner and outer layers 24, 26 to receive the rigid member 58 when the outer layer 26 is inelastic.

In some embodiments, the rigid member 58 is an inflatable member. In this embodiment, a plurality of inlets 72, as shown in FIG. 2, may be provided within the inner layer 24 and extend into each pocket 52, 54, 56 in order to fill the pockets 52, 54, 56 with a fluid, such as air or gas, until the pocket 52, 54, 56 reaches a predetermined pressure and becomes rigid. In some embodiments, the pocket 52, 54, 56 form a flexible sleeve configured to be filed with fluid through the inlet 72. In some other embodiments, a flexible sleeve may be provided within each of the pockets 52, 54, 56 and filled with fluid through the inlet 72. The flexible sleeve prevents fluid from flowing out of the pockets 52, 54, 56 and into the other areas between the inner and outer layers 24, 26 if the pockets 52, 54, 56 do not provide an air tight seal, such as through edges 44, 46, 48, 50 of the upper pocket 52. In addition, the fluid may reused by drawing the fluid out of each pocket 52, 54, 56 when the protective characteristics of the panel 22 are not desired and the fluid may be stored within a fluid supply.

As shown in FIG. 2, the panel 22 includes at least one connecting member 74 provided on the side edge 37 of the panel 22 and at least one connecting member 74 provided on the opposite side edge 39 of the panel 22. The connecting members 74 may be any suitable member for connecting to a vehicle edge or surface, such as hooks, magnets, snaps, hook and loop, fasteners, buckles, or the like. The connecting members 74 may be formed from rigid plastic in order to secure to the vehicle 10. In some embodiments the connecting members 74 may extend from either one or both of the inner and outer layers 24, 26 and be integrally formed therewith to form a monolithic structure. In other embodiments, the connecting members 74 are secured between the inner and outer layers 24, 26. As such, the connecting members 74 may be secured to either one or both of the inner and outer layers 24, 26 using any suitable connections such as by sewing, fabric welding, using an adhesive, or the like. The connecting members 74 may also extend from the upper edge 33 and the opposite lower edge 35 of the panel 22.

As shown in FIG. 2, each side edge of the panel 22 includes three connecting members 74 for securing to an edge of exterior body surface, such as the front fender 16 and the front driver door 18. The connecting members 74 on each side edge are spaced apart from one another to provide a gap 76 between each adjacent connecting member 74. In some embodiments, the connecting members 74 are equidistantly spaced apart from one another. In some embodiments, the connecting members 74 on one side edge of the panel 22 are offset from the connecting members 74 on the opposite side edge of the panel 22. Thus, when adjacent panels 22 are positioned on the vehicle 10, the connecting members 74 do not interfere with connecting members of an adjacent panel as would occur if the connecting members 74 were not offset and instead aligned with one another.

Figure 4:
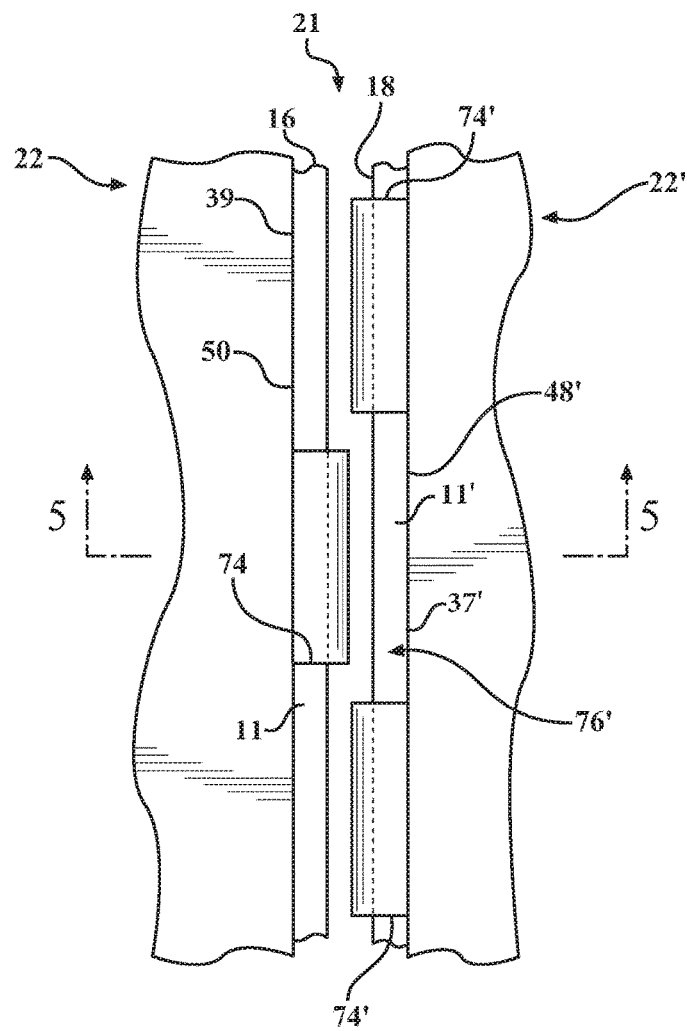
FIG. 4 schematically depicts an enlarged front view of a pair of adjacent panels secured to an exterior of a vehicle as shown in circle 4 of FIG. 1, according to one or more embodiments shown and described herein.

As shown in FIG. 4, the protective panel assembly 21 includes the panel 22 and a second panel 22'. The panel 22 having the connecting member 74 on the side edge 39 thereof is positioned over the exterior body surface 11 of the vehicle 10, such as the front fender 16. The second panel 22' is positioned over a second exterior body surface 11' of the vehicle 10, such as the front driver door 18. The second panel 22' referred to herein is identical to the panel 22 with like parts indicated as 74', 76', etc. As discussed herein, the connecting members 74 on one side edge 39 of the panel 22 may be offset from connecting members 74 on an opposite side edge 37' of the panel 22. Thus, the connecting members 74 on the panel 22 are shown as being offset from the connecting members 74' of the second panel 22'. Thus, the panels 22, 22' are able to be secured to the front fender 16 and the driver door 18 without interfering with one another. In situations when the panel 22 and the second panel 22' are closer together, the connecting members 74 on the panel 22 may be received within the gap 76' provided by an adjacent set of connecting members 74' on the second panel 22'. As shown in FIG. 4, the gap 76' between connecting members 74' on the second panel 22' receives the connecting member 74 on the panel 22 when the panel 22 and the second panel 22' are brought into proximity of one another to avoid interference of the connecting members 74, 74'.

Figure 5:
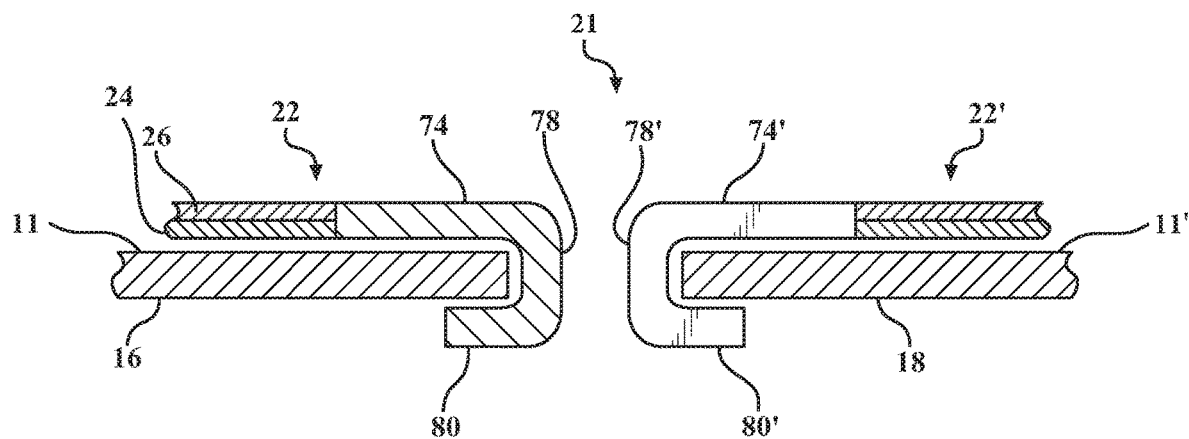
FIG. 5 schematically depicts a partial cross-sectional view of the pair of adjacent panels taken along line 5-5 of FIG. 4, according to one or more embodiments shown and described herein.

As shown in FIG. 5, a cross-sectional view of the panel 22 including a connecting member 74 attached to the front fender 16 and the second panel 22' including a connecting member 74 attached to the driver door 18. The connecting member 74 includes an arm 78 extending inwardly toward the first vehicle surface 16 and a finger 80 extending perpendicular to the panel 22. The finger 80 forms a cavity in order to receive an edge of the first vehicle surface 16. As shown, the connecting member 74 extends from both the inner and outer layers 24, 26 of the panel 22. Similarly, the connecting member 74' on the second panel 22' also includes an arm 78 extending inwardly toward the driver door 18, and a finger 80 extending perpendicular to the second panel 22' forming a cavity therebetween to receive an end of the driver door 18.

It should be appreciated that the inner and outer layers 24, 26, while flexible, still provide protection to the vehicle 10 against incoming debris. While the rigid members 58 provide an increased amount of protection, the rigid members 58 do not prevent the panel 22 from being rolled when not in use and stored. To roll the panel 22, the upper edge 44 of the panel 22 is rolled toward the lower edge of the panel 22 or, alternatively, the lower edge is rolled toward the upper edge in order to roll the panel 22. In doing so, the rigid members 58 remain extending longitudinally between rolled side edges of the panel 22.

In some embodiments, the rigid member 58 may be formed from a flexible material, and either one or both of the inner layer 24 and the outer layer 26 may be formed of a rigid material in order to add structure integrity to the panel 22. The rigid members 58 may be formed of a flexible material absorb an impact from incoming debris, thereby protecting the exterior body surface 11 of the vehicle 10.

From the above, it is to be appreciated that defined herein is a new and unique protective panel for a vehicle to protect the exterior of the vehicle from debris and that can be rolled when not in use.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A protective panel assembly for protecting an exterior surface of a vehicle, the protective panel assembly comprising:
a panel having an inner layer, an outer layer, and a plurality of rigid members, the inner layer and the outer layer formed of a flexible material, the plurality of rigid members positioned between the inner layer and the outer layer, the plurality of rigid members being spaced apart from each other; and
at least one connecting member extending from a first side edge of the panel and at least one connecting member extending from a second side edge of the panel for connecting the panel to a vehicle, each connecting member extending from the first side edge of the panel being offset from each connecting member extending from the second side edge of the panel.

2. The protective panel assembly of claim 1, wherein the plurality of rigid members extend generally parallel.

3. The protective panel assembly of claim 2, wherein the inner layer and the outer layer are attached together to form a plurality of pockets, each pocket housing one of the plurality of rigid members such that the plurality of rigid members are entirely embedded within the plurality of pockets.

4. The protective panel assembly of claim 1 further comprising a plurality of panels each having an inner layer, an outer layer, and a plurality of rigid members.

5. The protective panel assembly of claim 1, wherein each rigid member has a planar back surface abutting against the inner layer and a convex outer surface extending from the back surface and abutting against the outer layer.

6. The protective panel assembly of claim 1, wherein the inner layer and the outer layer are formed from vinyl.

7. The protective panel assembly of claim 1, wherein the inner layer and the outer layer are formed from polyvinyl chloride.

8. The protective panel assembly of claim 1, wherein the at least one connecting member is a hook.

9. The protective panel assembly of claim 8, wherein the hook includes an arm extending perpendicular to the inner and outer layer, and a finger extending perpendicular to the arm.

10. The protective panel assembly of claim 1, wherein the panel can be rolled.

* * * * *